United States Patent [19]

Sawada

[11] Patent Number: 5,759,316
[45] Date of Patent: Jun. 2, 1998

[54] PNEUMATIC TIRE WITH DOUBLE-TWISTED ORGANIC FIBER CARCASS CORDS

[75] Inventor: Hiroki Sawada, Tokyo, Japan

[73] Assignee: Bridgestone Corporation, Tokyo, Japan

[21] Appl. No.: 351,091

[22] Filed: Nov. 30, 1994

[30] Foreign Application Priority Data

Nov. 30, 1993 [JP] Japan ................ 5-300048

[51] Int. Cl.⁶ ............... B60C 9/02; B60C 9/04; D02G 3/48
[52] U.S. Cl. ............... 152/556; 57/237; 57/902; 152/451
[58] Field of Search ............... 152/556, 451; 57/902, 236, 241–242, 237

[56] References Cited

U.S. PATENT DOCUMENTS

| | | | |
|---|---|---|---|
| 2,586,795 | 2/1952 | Drisch et al. | 152/556 X |
| 4,328,324 | 5/1982 | Kock | 152/451 X |
| 4,787,200 | 11/1988 | Inada et al. | |

FOREIGN PATENT DOCUMENTS

| | | | |
|---|---|---|---|
| 3732438 | 4/1988 | Germany | 152/556 |
| 50-101686 | 8/1975 | Japan | |

Primary Examiner—Adrienne C. Johnstone
Attorney, Agent, or Firm—Sughrue, Mion, Zinn, Macpeak, & Seas, PLLC

[57] ABSTRACT

A pneumatic tire has organic fiber carcass cords. The organic fiber carcass cords comprise double-twisted fiber yarns and satisfy the following equations.

$$n_2/n_1 > 1$$

$$\sqrt{D_2/D_1} < N_2/N_1$$

$$N_2/N_1 \leq 8$$
$$N_2 < 0.68$$
$$N_1 = n_1 \times (0.139 \times D_1/\rho)^{1/2} \times 10^{-3}$$
$$N_2 = n_2 \times (0.139 \times D_2/\rho)^{1/2} \times 10^{-3}$$

where $D_1$ is the original denier, $D_2$ is the total of the original denier, $N_1$ is a ply-twisting coefficient, $N_2$ is a cable-twisting coefficient, $n_1$, is the ply-twisting number (turns/10 cm), $n_2$ is the cable-twisting number (turns/10 cm) and $\rho$ is the specific gravity of the organic fiber.

4 Claims, No Drawings

PNEUMATIC TIRE WITH DOUBLE-TWISTED ORGANIC FIBER CARCASS CORDS

BACKGROUND OF THE INVENTION

1. Field of the Invention

The present invention relates to a pneumatic tire using a double-twisted organic fiber carcass cord, and having good tire side evenness, high tire side rigidity, high initial tensile rigidity, and reduced weight.

2. Background of the Invention

In the past, when an organic resin fiber, such as a polyester fiber, was used for an organic resin fiber carcass cord for a tire, only cords having a twisting structure with the same ply-twisting number $n_1$, and cable-twisting number $n_2$ (i.e., a balanced cord), were selected in order to prevent deterioration in the wear strength of the cord.

Usually, a cord having a cable-twisting coefficient $N_2$ of about 0.7 and a ply-twisting coefficient $N_1$ of about 0.5 was used, where both the cable-twisting and ply-twisting coefficients were fairly high (e.g., $0.5 \leq N_1$ and $0.7 \leq N_2$).

For example, when a fiber cord having a twisting structure 1500D/2 (i.e., two 1500 denier plies which have been twisted together) was used, the ply-twisting number was about 40 turns/10 cm and the cable-twisting number was about 40 turns/10 cm; and when a cord having a twisting structure 1000D/2 was used, the ply-twisting number was about 50 turns/10 cm and the cable-twisting number was about 50 turns/10 cm.

In order to prevent deterioration of the wear strength of the cord, a cord having a large twisting number and a ply-twisting number that is the same as its cable-twisting number has been used.

However these are not the best properties of a tire carcass cord either for controlling the initial tensile rigidity of the cord, or for reducing the tire side unevenness (that is, increasing the unevenness index), or for heightening the rigidity of the tire side. Furthermore, the radius of the cord increases with a higher twisting number. This is disadvantageous for weight reduction because the gauge of the cord coating rubber is increased.

As described above, for a balanced cord, that is, a cord having a ply-twisting number $n_1$ (turns/10 cm) that is the same as its cable-twisting number $n_2$ (turns/10 cm), it is difficult to satisfy both wear resistance and other properties, such as a good tire side evenness (i.e., a large unevenness index), high tire side rigidity, and reduced weight by reducing the radius of the cord.

SUMMARY OF THE INVENTION

In view of the above-described problems of the prior art, an object of the present invention is to provide a pneumatic tire having good tire side evenness (i.e., a large unevenness index), high tire side rigidity, high initial tensile rigidity and reduced weight, by using an unbalanced tire carcass cord having a cable-twisting number that is different from its ply-twisting number.

The present inventor has found that the above objects are achieved by a pneumatic tire having carcass cords made of organic fibers, wherein said organic fiber cord is double-twisted and the carcass cords satisfy the following equations:

$$n_2/n_1 > 1$$

$$\sqrt{D_2/D_1} < N_2/N_1$$

$$N_2/N_1 \leq 8$$

$$N_2 < 0.68$$

$$N_1 = n_1 \times (0.139 \times D_1/\rho)^{1/2} \times 10^{-3}$$

$$N_2 = n_2 \times (0.139 \times D_2/\rho)^{1/2} \times 10^{-3}$$

where:

$D_1$ is the original denier;

$D_2$ is the total of the original denier;

$N_1$ is a ply-twisting coefficient;

$N_2$ is a cable-twisting coefficient;

$n_1$ is the ply-twisting number (turns/10 cm);

$n_2$ is the cable-twisting number (turns/10 cm); and $\rho$ is the specific gravity of the organic fiber.

DETAILED DESCRIPTION OF THE INVENTION

The present invention is described in greater detail below.

A pneumatic tire of the present invention has a carcass ply. The structural components of a pneumatic tire for use in the present invention and a method for making the same are described, for example, in U.S. Pat. Nos. 4,669,519 and 4,708,185, incorporated herein by reference.

The carcass cord is made of double-twisted organic fiber yarns, that is, organic fiber yarns that are first twisted (ply-twisting) with a twisting coefficient $N_1$ which satisfies the following equations. Then, several of the ply-twisted yarns are gathered and twisted (cable-twisting) to form the cord in a direction opposite the ply-twisting direction with a twisting coefficient $N_2$ which also satisfies the following equations. The equations which $N_1$ and $N_2$ satisfy are:

$$n_2/n_1 > 1$$

$$\sqrt{D_2/D_1} < N_2/N_1$$

$$N_2/N_1 \leq 8$$

$$N_2 < 0.68$$

where:

$D_1$ is the original denier;

$D_2$ is the total of the original denier;

$N_1$ is a ply-twisting coefficient;

$N_2$ is a cable-twisting coefficient;

$n_1$ is the ply-twisting number (turns/10 cm); and $n_2$ is the cable-twisting number (turns/10 cm).

Furthermore, $N_1$, $N_2$, $D_1$, $D_2$, $n_1$, and $n_2$ also satisfy the following equations:

$$N_1 = n_1 \times (0.139 \times D_1/\rho)^{1/2} \times 10^{-3}$$

$$N_2 = n_2 \times (0.139 \times D_2/\rho)^{1/2} \times 10^{-3}$$

where $\rho$ is the specific gravity of the organic fiber (g/cm$^3$)

$N_1$ is the ply-twisting coefficient which is the tangent of the angle between the axis along a straight fiber yarn before twisting into a ply and the axis along a twisted fiber yarn in the ply ($\theta_1$).

$N_2$ is the cable-twisting coefficient which is the tangent of the angle between the axis along a ply-twisted fiber yarn and the axis along a cable-twisted ply ($\theta_2$).

When $N_2$ is equal to or more than 0.68, the radius of the cord increases, the initial tensile rigidity of the cord decreases, and the heat shrinkage of the cord increases. As a result, tire side unevenness increases (i.e., a decrease in the unevenness index), tire side rigidity decreases, and it is difficult to reduce the tire weight. When $N^2/N_1>8$, the radius of the cord also increases, the initial tensile rigidity of the cord decreases, and the heat shrinkage of the cord increases. Consequently, tire side unevenness increases, tire side rigidity decreases, and it is difficult to reduce tire weight. Preferably, $1.7<N_2/N_1<3.6$, and a preferred range of the ratio "$n_2/n_1$" is 1.2 to 2.6.

The term "original denier" means the sum of the weights of the individual fiber yarns in a ply before they are ply-twisted, and the term "the total of the original denier" means the sum of the original deniers of each ply in a cord.

The ply-twisting number, the cable-twisting number, the ply-twisting coefficient and the cable-twisting coefficient, are described, for example, in U.S. Pat. No. 5,115,854 incorporated herein by reference.

When the radius of a yarn in a ply is r (cm) and the pitch of twisting is 1, $n_1=10/1$ (turns/10 cm), and $D_1=\pi r^2 \times 9000 \times 10^2 \times \rho$. From the above definition, when the twisting angle is $\theta_1$, $N_1=\tan\theta_1=2\rho r/l$. The equation $N_1=n_1\times(0.139\times D_1/\rho)^{1/2}\times 10^{-3}$ is derived by incorporating the first two equations into the above definition. In a similar manner, the equation $N_2=n_2\times(0.139\times D_2/\rho)^{1/2}\times 10^{-3}$ is also obtained. Now, by substituting $N_1$ and $N_2$ of the equation $\sqrt{D_2/D_1}<N_2/N_1$ into the equations for $N_1$ and $N_2$, the relationship $n_2/n_1>1$ is obtained.

The organic resin fiber for use in the present invention is not particularly limited. Examples of useful organic resin fibers include polyester fibers, polyamide fibers and rayon fibers. Specific examples of the organic resin fibers for use in this invention are described, for example, in U.S. Pat. No. 4,669,519, incorporated herein by reference.

The radius of a cord is chosen depending upon the specific tire application and is not particularly limited.

Also, preferably, the initial tensile rigidity is at least 30 gf/denier (D), more preferably, at least 70 gf/D.

In general, in the case of a conventionally twisted cord, in which the direction of the ply-twisting and cable-twisting are not the same, and $n_2$ and $n_1$, are the same, the axis along the ply-twisted yarn in the finished cord becomes parallel to the direction of the strand of the cable-twisting regardless of the direction of twisting. This is called Z-twisting or S-twisting as described in JIS L1017-1983.

The cord of the present invention satisfies the equations $n_2/n_1>1$, $N_2 \leq 8\times N_1$, and $N_2<0.68$. As a result, the finished double-twisted cord has some twisting in the direction of the cable-twisting which leads to a reduction in the spiral radius of the cable-twisting and a reduction in the gap among filaments.

Consequently, the radius of the cord is reduced, and less rubber is needed to obtain the same cord layer gauge as a conventional cord, which makes the resulting tire lighter. A cord layer is a rubber sheet containing a plurality of fiber cords.

The cord of the present invention has less gap among filaments, and a smaller spiral radius of the cable-twisting. Thus, when the cord is stretched, the effect of the high tensile rigidity of the constituent filaments is apparent. This leads to higher initial tensile rigidity of the cord. As a result, the unevenness index of the tire side increases, and tire side rigidity increases.

The initial tensile rigidity (gf/D) is measured as described in JIS L1017-1983.

The strength of the cords is measured as described in JIS L1017-1983.

The wear resistance index appearing in the Examples below is defined as follows.

The wear resistance index measurement is based on the G.Y. type tube wear resistance test described in JIS L1017-1983.

$$Index = t/T$$

where t is the number (turns) that a tube made of the cord layer of the present invention rotates before it breaks; and T is the number (turns) that a tube made of a conventional reference cord layer rotates before it breaks.

The higher the index, the better the wear resistance.

The unevenness index is measured as follows.

Test tires having a normal internal pressure of about 1.80 kgf/cm² are prepared. Test tires can be prepared, for example, as described in U.S. Pat. No. 5,147,477.

The maximum width of the tires is measured at four different points for each tire, and the average is calculated.

Then, the maximum width of the tires at the joint is measured. If there is more than one joint in one tire, the maximum width at all the joints is measured and the smallest value is taken as the minimum of the maximum width.

The maximum width of the tires is described, for example, in U.S. Pat. Nos. 4,513,802 and 4,669,519, incorporated herein by reference.

The unevenness index is calculated as follows.

$$Index = \{(W_1-W_2)/(w_1-w_2)\}\times 100$$

where $W_1$ is the average of the maximum width (cm) of a conventional reference tire, $W_2$ is the minimum of the maximum width (cm) of a conventional reference tire at the joint, $w_1$ is the average of the maximum width (cm) of the tire of the present invention at four different places, and $w_2$ is the minimum of the maximum width (cm) of the tire of the present invention at the joint. Because the difference between the average and minimum of the maximum width of a conventional reference tire is given as the numerator, the index increases as the tire side unevenness of a tire under evaluation decreases. A joint is a place where the end of a cord layer overlaps with another end of a cord layer. A tire can contain more than one joint.

The weight reduction index is measured as follows.

Sample cord layers having the same coating rubber gauge on both sides of the cord, the same cord number per unit area, and the same size of the area are prepared and each sample is weighed. The weight reduction index is calculated as follows.

$$Index = (W/w)\times 100$$

where W is weight (g/m²) of a conventional reference cord layer and w is the weight of the cord layer of a tire under evaluation. Because the weight of a conventional reference cord layer is given as the numerator, the index increases as the cord layer gauge decreases.

EXAMPLES

The present invention is further described in the following Examples, but the invention should not be construed as being limited thereto.

(1) Examples 1–3, Comparative Examples 1–4

Tires having a carcass cord using a four-denier-per-filament, multi-filament polyethylene terephthalate fiber (i.e., 4dpf-PET) carcass cord were prepared in size 155/70R12. The tires thus prepared were evaluated with respect to initial tensile rigidity, strength of the cord, wear resistance, tire side unevenness and weight reduction as described above. The characteristics of the cord used in each Example and Comparative Example, and the test results are shown in Table 1.

TABLE 1

| | Comparative Examples | | | | Examples | | |
|---|---|---|---|---|---|---|---|
| | 1 | 2 | 3 | 4 | 1 | 2 | 3 |
| Tire Size | 155/70R12 | | | | 155/70R12 | | |
| Type of Fiber Used | Polyester | | | | Polyester | | |
| Twisting Structure | 1000D/2 | | | | 1000D/2 | | |
| $n_1 \times n_2$ | 45 × 45 | 60 × 40 | 30 × 60 | 5 × 40 | 8 × 45 | 24 × 45 | 41 × 45 |
| $\sqrt{D_2/D_1}$ | 1.41 | 1.41 | 1.41 | 1.41 | 1.41 | 1.41 | 1.41 |
| $N_2/N_1$ | 1.41 | 0.94 | 2.82 | 11.31 | 7.95 | 2.65 | 1.55 |
| $N_2$ | 0.64 | 0.57 | 0.85 | 0.57 | 0.64 | 0.64 | 0.64 |
| Radius of Cords (cm) | 0.53 | 0.55 | 0.57 | 0.52 | 0.52 | 0.50 | 0.51 |
| Initial Tensile Rigidity | *100 | 95 | 85 | 103 | 104 | 106 | 104 |
| Strength of Cord | 100 | 97 | 88 | 105 | 101 | 105 | 102 |
| Wear Resistance | 100 | 95 | 101 | 95 | 100 | 101 | 101 |
| Tire Side Unevenness | 100 | 100 | 95 | 101 | 103 | 105 | 103 |
| Weight Reduction | 100 | 98 | 98 | 101 | 101 | 105 | 103 |

*All measurements were made relative to the conventional reference tire of Comparative Example 1 assigned a value of 100.

(2) Examples 4–6, Comparative Examples 5–8

Tires having a carcass cord using a 4dpf-PET carcass cord were prepared in size 185/70R14. The tires thus prepared were evaluated with respect to initial tensile rigidity, strength of the cord, wear resistance, tire side unevenness and weight reduction as described above. The characteristics of the cord used in each Example and Comparative Example, and the test results are shown in Table 2.

TABLE 2

| | Comparative Examples | | | | Examples | | |
|---|---|---|---|---|---|---|---|
| | 5 | 6 | 7 | 8 | 4 | 5 | 6 |
| Tire Size | 185/70R14 | | | | 185/70R14 | | |
| Type of Fiber Used | Polyester | | | | Polyester | | |
| Twisting Structure | 1500D/2 | | | | 1500D/2 | | |
| $n_1 \times n_2$ | 37 × 37 | 50 × 35 | 25 × 50 | 3 × 35 | 7 × 37 | 21 × 37 | 35 × 37 |
| $\sqrt{D_2/D_1}$ | 1.41 | 1.41 | 1.41 | 1.41 | 1.41 | 1.41 | 1.41 |
| $N_2/N_1$ | 1.41 | 0.99 | 2.83 | 16.49 | 7.48 | 2.49 | 1.50 |
| $N_2$ | 0.64 | 0.61 | 0.87 | 0.61 | 0.64 | 0.64 | 0.64 |
| Radius of Cords (cm) | 0.65 | 0.68 | 0.70 | 0.64 | 0.64 | 0.60 | 0.6 |
| Initial Tensile Rigidity | *100 | 95 | 85 | 103 | 104 | 106 | 104 |
| Strength of Cord | 100 | 97 | 88 | 105 | 101 | 105 | 102 |
| Wear Resistance | 100 | 95 | 101 | 95 | 100 | 101 | 101 |
| Tire side Unevenness | 100 | 100 | 95 | 101 | 103 | 105 | 103 |
| Weight Reduction | 100 | 98 | 98 | 101 | 101 | 105 | 103 |

*All measurements were made relative to the conventional reference tire of Comparative Example 5 assigned a value of 100.

(3) Example 7, Comparative Example 9

Tires having a carcass cord using a Nylon 66 carcass cord were prepared in size 155/70R12. The tires thus prepared were evaluated with respect to initial tensile rigidity, strength of the cord, wear resistance, tire side unevenness and weight reduction as described above. The characteristics of the cord used in each Example and Comparative Example, and the test results are shown in Table 3.

TABLE 3

| | Comparative Example 9 | Example 7 |
|---|---|---|
| Tire Size | 155/70R12 | 155/70R12 |
| Type of Fiber Used | Polyamide (Nylon 66) | Polyamide (Nylon 66) |
| Twisting Structure | 1260D/2 | 1260D/2 |
| $n_1 \times n_2$ | 39 × 39 | 8 × 30 |
| $\sqrt{D_2/D_1}$ | 1.41 | 1.41 |
| $N_2/N_1$ | 1.41 | 5.30 |
| $N_2$ | 0.68 | 0.53 |
| Radius of Cords (cm) | 0.60 | 0.59 |
| Initial Tensile Rigidity | *100 | 102 |
| Strength of Cord | 100 | 110 |
| Wear Resistance | 100 | 100 |
| Tire Side Unevenness | 100 | 103 |
| Weight reduction | 100 | 103 |

*All measurements were made relative to the conventional reference tire of Comparative Example 9 assigned a value of 100.

(4) Examples 8–9, Comparative Example 10

Tires having a carcass cord using a Nylon 66 carcass cord or a rayon carcass cord were prepared in size 185/70R14. The tires thus prepared were evaluated with respect to initial tensile rigidity, strength of the cord, wear resistance, tire side unevenness and weight reduction as described above. The characteristics of the cord used in each Example and Comparative Example, and the test results are shown in Table 4.

TABLE 4

|  | Comparative Example | Examples | |
| --- | --- | --- | --- |
|  | 10 | 8 | 9 |
| Tire size | 185/70R14 | 185/70R14 | |
| Type of Fiber Used | Polyamide (Nylon 66) | Polyamide (Nylon 66) | rayon |
| Twisting Structure | 1260D/2 | 1260D/2 | 1650D/2 |
| $n_1 \times n_2$ | 32 × 32 | 7 × 25 | 8 × 39 |
| $\sqrt{D_2/D_1}$ | 1.41 | 1.41 | 1.41 |
| $N_2/N_1$ | 1.41 | 5.05 | 7.07 |
| $N_2$ | 0.67 | 0.54 | 0.67 |
| Radius of Cords (cm) | 0.78 | 0.76 | 0.69 |
| Initial Tensile Rigidity | *100 | 103 | 120 |
| Strength of Cord | 100 | 108 | 100 |
| Wear Resistance | 100 | 100 | 100 |
| Tire Side Unevenness | 100 | 103 | 110 |
| Weight Reduction | 100 | 102 | 102 |

*All measurements were made relative to the conventional reference tire of Comparative Example 10 assigned a value of 100.

The unbalanced cord of the present invention has a ply-twisting number $n_1$ that is smaller than $n_2$. As a result, the tire side unevenness is reduced, the tire side rigidity and initial tensile rigidity of the cord is increased, and the tire weight is reduced. As compared to a conventional balanced cord, the cost of the twisting step is reduced. This is because the total twisting number ($n_1+n_2$) is reduced.

While the invention has been described in detail and with reference to specific embodiments thereof, it will be apparent to one skilled in the art that various changes and modifications can be made therein without departing from the spirit and scope thereof.

What is claimed is:

1. A pneumatic tire having carcass cords comprising organic fibers, wherein for each cord said organic fibers are formed into yarns and said yarns are first ply-twisted together to form at least two plies, then said at least two plies are gathered and cable-twisted together in a direction opposite the ply twisting direction to form the cord and the cords satisfy the following equations:

$$n_2/n_1 > 1$$

$$\sqrt{D_2/D_1} < N_2/N_1$$

$$N_2/N_1 \leq 8$$
$$N_2 < 0.68$$
$$N_1 = n_1 \times (0.139 \times D_1/\rho)^{1/2} \times 10^{-3}$$
$$N_2 = n_2 \times (0.139 \times D_2/\rho)^{1/2} \times 10^{-3}$$

where:

$D_1$ is the original denier;

$D_2$ is the total of the original denier;

$N_1$ is a ply-twisting coefficient;

$N_2$ is a cable-twisting coefficient;

$n_1$ is the ply-twisting number (turns/10 cm);

$n_2$ is the cable-twisting number (turns/10 cm); and $\rho$ is the specific gravity of the organic fibers; wherein the organic fibers of the carcass cord are either polyester fibers, aliphatic polyamide fibers or rayon fibers.

2. The pneumatic tire of claim 1 wherein the organic fibers of the carcass cord are polyester fibers.

3. The pneumatic tire of claim 1 wherein the organic fibers of the carcass cord are aliphatic polyamide fibers.

4. The pneumatic tire of claim 1 wherein the organic fibers of the carcass cord are rayon fibers.

* * * * *